United States Patent [19]

Torii et al.

[11] Patent Number: 4,780,810
[45] Date of Patent: Oct. 25, 1988

[54] DATA PROCESSOR WITH ASSOCIATIVE MEMORY STORING VECTOR ELEMENTS FOR VECTOR CONVERSION

[75] Inventors: Shunichi Torii, Musashino; Keiji Kojima, Kokubunji; Noriyasu Ido, Yokohama, all of Japan

[73] Assignee: Hitachi, Ltd., Tokyo, Japan

[21] Appl. No.: 737,453

[22] Filed: May 24, 1985

[30] Foreign Application Priority Data

May 25, 1984 [JP] Japan ................................ 59-104542

[51] Int. Cl.⁴ ...................... G06F 15/347; G06F 5/00
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,633,179 | 1/1972 | Reynolds | 364/200 |
| 3,699,533 | 10/1972 | Hunter | 364/200 |
| 3,771,142 | 11/1973 | Minshull et al. | 364/200 |
| 4,024,508 | 5/1977 | Bachman et al. | 364/200 |
| 4,084,231 | 4/1978 | Capozzi et al. | 364/200 |
| 4,115,850 | 9/1978 | Houston et al. | 364/200 |
| 4,128,880 | 12/1978 | Cray | 364/200 |
| 4,392,200 | 7/1983 | Arulpragasam et al. | 364/200 |
| 4,410,944 | 10/1983 | Kronies | 364/200 |

FOREIGN PATENT DOCUMENTS 57-134750  8/1982  Japan .

OTHER PUBLICATIONS

"Introduction to Data Base Systems", C. J. Pate, 3rd Edition, pp. 171-180.

Primary Examiner—Raulfe B. Zache
Assistant Examiner—Thomas C. Lee
Attorney, Agent, or Firm—Antonelli, Terry & Wands

[57] ABSTRACT

Associative keys and retrieve outputs corresponding thereto are registered to an associative memory in a vector data conversion apparatus. Conversion vector data stored in the main storage and comprising vector elements of the same type of an associative key is sequentially read out for each vector element and is inputted to a comparator, which then compares the vector element with the associative keys beforehand registered to the associative memory so as to determine whether or not a matching condition exists therebetween. When the comparator detects the matching condition, a retrieve output corresponding to the matched associative key is read out from the associative memory and is stored in the main storage. While the conversion vector data is sequentially read out for each vector in this manner, the retrieve output data is sequentially stored in the main storage so as to generate the converted vector data comprising the retrieve output data as vector elements. A user identifier may also be inputted as a compare element together with the associative key, thereby preventing an erroneous data conversion from taking place even when a plurality of users share the vector data conversion apparatus.

2 Claims, 4 Drawing Sheets

| USER SPECIFIED ASSOCIATIVE KEY | USER IDENTIFIER | RETRIEVAL DATA |
|---|---|---|
| USER SPECIFIED ASSOCIATIVE KEY | USER IDENTIFIER | RETRIEVAL DATA |
| USER SPECIFIED ASSOCIATIVE KEY | USER IDENTIFIER | RETRIEVAL DATA |
| USER SPECIFIED ASSOCIATIVE KEY | USER IDENTIFIER | RETRIEVAL DATA |

DATA PROCESSOR WITH ASSOCIATIVE MEMORY STORING VECTOR ELEMENTS FOR VECTOR CONVERSION

BACKGROUND OF THE INVENTION

The present invention relates to a data processor with an apparatus capable of converting data elements at a higher speed and to a method for the conversion, and in particular, to a vector data processor having a vector processing-function for relational data base and capable of sequentially converting data elements.

There has been rapidly developed a data base technology for accomplishing an efficient control of a large amount of data. The data base processing handles mainly three types of data bases, namely, hierarchical, network and relational data bases. The former two data bases are designed to process a large volume of data at a high speed and requires complex operations suitable for the expert users versed n the data base operations. On the other hand, the relational data base, handling a relatively small amount of data, is implemented by a simple operation and is expected to be considerably developed in the future; however, it has a problem that the processing speed is reduced when the data capacity increases.

FIG. 1 is a schematic representation of a logical data structure of a relational data base containing information about parts as an example. The information is stored in a table format in a disk unit 110 (FIG. 2). A table 100 comprises a line 101 referred to as a record, row, or tupple and a column 102. As shown in FIG. 2, the data is physically stored in record units in fixed-length blocks (120a, 120b, etc.) each called a page on the disk 110. A plurality of records are stored in a page in ordinary cases. An address of a record on a disk (referred to as a record address) comprises a page number and a displacement address from the head of a page. Such an example has been disclosed by C. J. Date in "An Introduction to Database Systems" (3rd ed. p 173–174). In this report, the record address is referred to as a tupple identifier (TID).

A relational data base control program 240 stored in a main storage 200 reads pages containing the necessary records from the disk and stores the pages in an input-/output buffer area 201 in the main storage. The pages and records thus obtained are indicated by reference numerals 220a, 220b and 221a, 221b, respectively in FIG. 2. Unlike a page and a record on the disk which are addressed by use of a record address and a page number, respectively, a page and a record in the main storage are addressed by a main storage address; consequently, the relational data base control program must include processing for converting the addresses therebetween.

When the main storage has a small capacity for storing data, each page must be read to obtain a record from the disk, hence the most part of the processing time is consumed for the input/output time in order to access the disk 110. The recent progress in the semiconductor technology, however, has realized a large capacity main storage, for example, 32 megabytes (MB), which makes it possible to store the overall table or all pages in the buffer area 201 in the main storage, thereby enabling to greatly reduce the input/output time to access the disk 110. The problem to reduce the processor execution time remains.

Various vector processors have been proposed to improve the processing speed, for example, CRAY-1 developed the first machine of such type.

In the past, however, the processing was conducted by using a record as the processing unit as depicted in FIG. 1. This method can be advantageously applied to a main storage having a small capacity, for example, when the buffer area is equivalent to only several pages. On the other hand, when the data elements in the record direction is assumed to constitute a vector, the data type and arithmetic operation each varies between these data elements; thus such a data structure has been considered not to be suitable for the vector processing. Contrary, if the main storage has a large capacity, the following processing system in accordance with the novel ideas of the present invention becomes implementable.

That is, if the overall table fetched from the disk is stored beforehand in the main storage, each set of data elements obtained along the column direction can be assumed to be a vector data. In this situation, the vector processing can be favorably applied because:

(1) Each vector element is of the same data type, and (2) Each vector element undergoes the same arithmetic operation, for example, move, comparison, or selection. In the following paragraphs, the new operations of a concrete relational data base program will be described by referring to each step of a data retrieval example for obtaining the part names for which the manufacturer's name is HITACHI in the parts table 100 of FIG. 1.

(1) A list of record addresses of the records belonging to the table is created in the vector work area 18 of the main storage 200 (indicated by reference numeral 7 in FIG. 2). The table has ordinarily an index for each several columns. For each of record, the index contains a pair of the column value and a record address (not shown in FIG. 2). Consequently, if the index is constructed in the vector format, the record address list can be created by use of a vector move instruction. For example, assume that an index is provided for the part codes of the part table 100 in FIG. 1. In this case, however, the obtained record addresses are not necessarily ordered in the page number sequence, that is, they are obtained at random with respect to the page number.

(2) A main storage address list of the records belonging to the table is created in a vector work area 31 of the main storage 200 (indicated by reference numeral 6 in FIG. 2). This provision implements the address conversion described before so as to improve the processing speed in accordance with the present invention. For each record, it has been conventionally required to extract a page number based on a record address and to search for the page having the same page number in the pages (221a, 221b, etc.) of the buffer area 201 of FIG. 2. The time required for this processing is increased as the buffer area capacity becomes greater. In addition, the processing speed improvement by use of the vector arithmetic operation was not attempted in the prior art because the vector processing was not applicable to this processing; consequently, this processing has been a bottleneck in the system performance if it is utilized in a relational data base system in a large capacity main storage.

(3) Based on a main storage address of the record obtained in step (2) above, the item name address of the manufacturer's name is calculated for each record, and the record whose manufacturer's name is HITACHI is selected by comparing the manufacturer's name. This processing is accomplished by use of instructions such as a vector add instruction and a vector compare instruction.

(4) The records satisfying the retrieval processing conditions are transferred. Only the part name items of the records selected in step (3) above are transferred to an area, for example, a display area for storing the retrieval results. This processing is carried out by use of instructions such as a vector move instruction having an indirect address function.

Among the processing of steps (1) to (4) described above, the address conversion of step (2) is the most difficult processing in applying the vector processing thereto in order to improve the processing speed by use of a vector processor, and will thus become a bottleneck of the system performance. This is a new problem appeared in this attempt to improve the relational data base processing speed by use of the vector operation.

An address conversion mechanism in a data base has been disclosed, for example, in the U.S. Pat. No. 4,024,508 of C. W. Bachman et al assigned to Honeywell Information Systems, Inc. In this system a descriptor is prepared for each of the pages which contain at least one of the records in a data base and which are already read out to a main storage. Each descriptor includes a corresponding page. When a main storage address of a record is to be determined, descriptor which includes the same page number as one assigned for the record must be searched. The descriptors are provided on the main storage and are sequentially chained. Therefore processing time for the search increases with a total number of the descriptors.

SUMMARY OF THE INVENTION

It is therefore an object of the present invention to provide a data processor with a data converter which is capable of converting data in a vector format into the corresponding vector-format data at a higher speed.

Another object of the present invention is to provide a data processor with a data converter which properly converts vector-format data when a plurality of users execute the respective programs by commonly utilizing the data converter.

Still another object of the present invention is to provide a method for converting data in a vector format into the corresponding vector-format data at a higher speed.

In accordance with an embodiment of the present invention, there is provided a data processor with a data conversion apparatus comprising an associative memory means for storing associative keys and retrieval data corresponding thereto, first read means for sequentially reading for each vector conversion vector data stored in a data storage and consisting of vector elements of the same type as the associative key, said associative memory means comparing the vector elements sequentially read out by said first read means with the associative keys and generating an output signal when the vector element matches with one of the associative keys, second read means responsive to the output signal from said associative memory means for reading a retrieval data item corresponding to the associative key matched in said associative memory means, and store means for sequentially storing the retrieval data from said second read means in said data storage and for generating conversion vector output data corresponding to the converted vector data by utilizing the retrieval data as vector elements.

In accordance with another embodiment of the present invention, said data conversion apparatus further includes a user identifier register for storing a user identifier of a user instructing a data conversion wherein, for each associative key, a user identifier data item of a user specifying the associative key is added, and said associative memory means compares the user identifier data item in said user identifier register with the user identifier data items in addition to the comparison between the vector elements of the converted vector data and the associative keys in said associative memory means.

DESCRIPTION OF THE PREFERRED EMBODIMEN

An embodiment of the present invention will be described in detail by referring to the accompanying drawings.

Figures 3, 4:
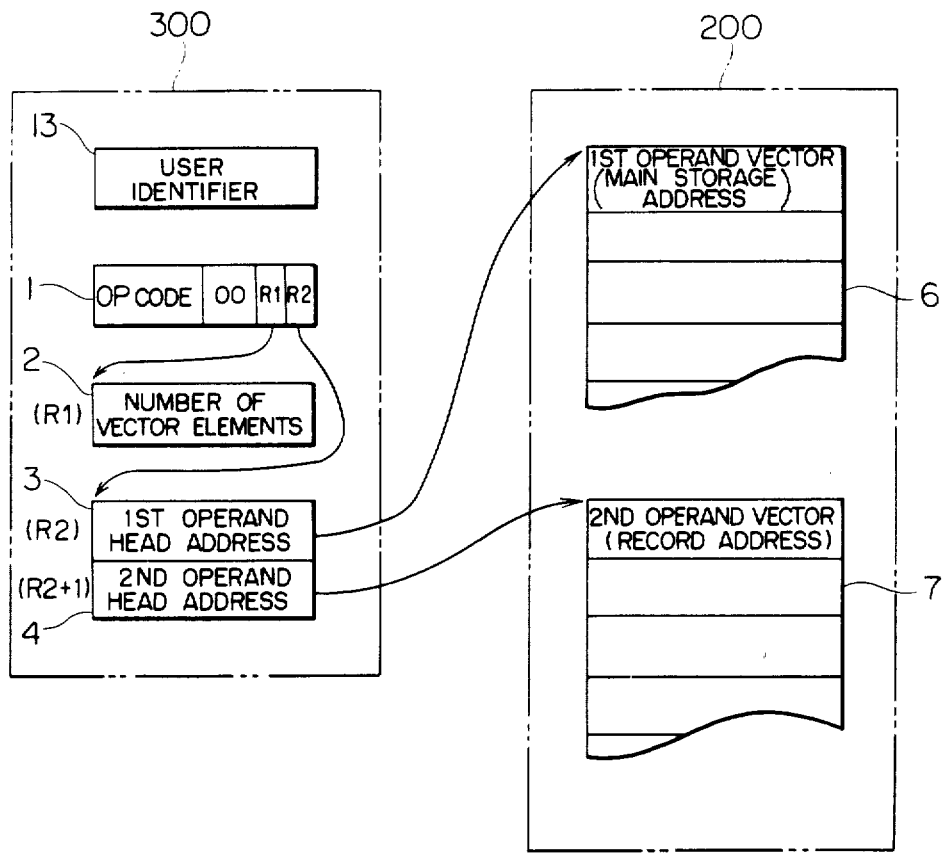
FIG. 3 is a schematic block diagram demonstrating operations of vector instructions utilizing the data conversion apparatus of the present invention.
FIG. 4 is a simplified diagram illustrating a data configuration example of a memory for association data utilized in the data conversion apparatus of the present invention.

FIG. 3 is a schematic block diagram illustrating operations of new vector instructions which can be implemented by use of the vector conversion apparatus of the present invention, namely an, Associative Memory Vector Registration instruction and an Associative Memory Vector Retrieval instruction (to be abbreviated as Registration and Retrieve instructions, respectively). These vector instructions are represented in a common instruction format 1. Two high-order bytes of a 4-byte instruction 1 specify an operation code of these two instructions. The last one byte is used to specify two general-purpose registers R1 and R2. A general-purpose register 2 specified by R1 stores the number of vector elements of each conversion vector data. A general-purpose register 3 specified by R2 contains the first address of a vector 6 to be used as a retrieval output data item of the Retrieve instruction or a registration input data of the Registration instruction. A general-purpose register 4 specified by (R2+1) stores the first address of vector data 7 to be converted having as a vector element thereof the page address specified as an associative key by the user. Each vector element comprises four bytes and is consecutively allocated in the main storage.

A user identifier register 13 contains a user identifier for identifying each user. The operating system sets a value unique to each user to this register, and the value cannot be changed by the user. For example, the VOS3 operating system on the general-purpose M280H processor produced by Hitachi Ltd. sets the first address of the virtual/real space address translation table for each user space to the first control register, that is, this control register can be used as the user identifier register described above.

FIG. 4 is a simplified schematic diagram illustrating the configuration of a memory for association data or a conversion table memory 23 utilized in this embodiment. Each entry or cell of the memory 23 comprises three fields each consisting of four bytes. A first field 41 is used to store an associative key specified by the user, a second field 42 contains a user identifier of the user specifying the associative key of the same entry, and a third field 43 stores a retrieval output data corresponding to the associative key of the same entry. When a user specified associative key and a user identifier are inputted, the memory 23 outputs a retrieval data item from an associative memory cell of which the first and second fields match with the input values. This function is required when a plurality of relational data base programs independently process the respective data bases in FIG. 2. Since the record addresses are uniquely assigned only in each data base, it is necessary to provide means for identifying each data base. For this purpose, in addition to the record address, information for identifying a relational data base program, i.e., an identifier of a user accessing a relational data base must also be included in the data for the address conversion so as to prevent a relational data base program from erroneously or intentionally accessing the contents of other relational data base or buffer areas of other users. FIG. 4 illustrates an example of a 4-entry configuration.

Figure 5:
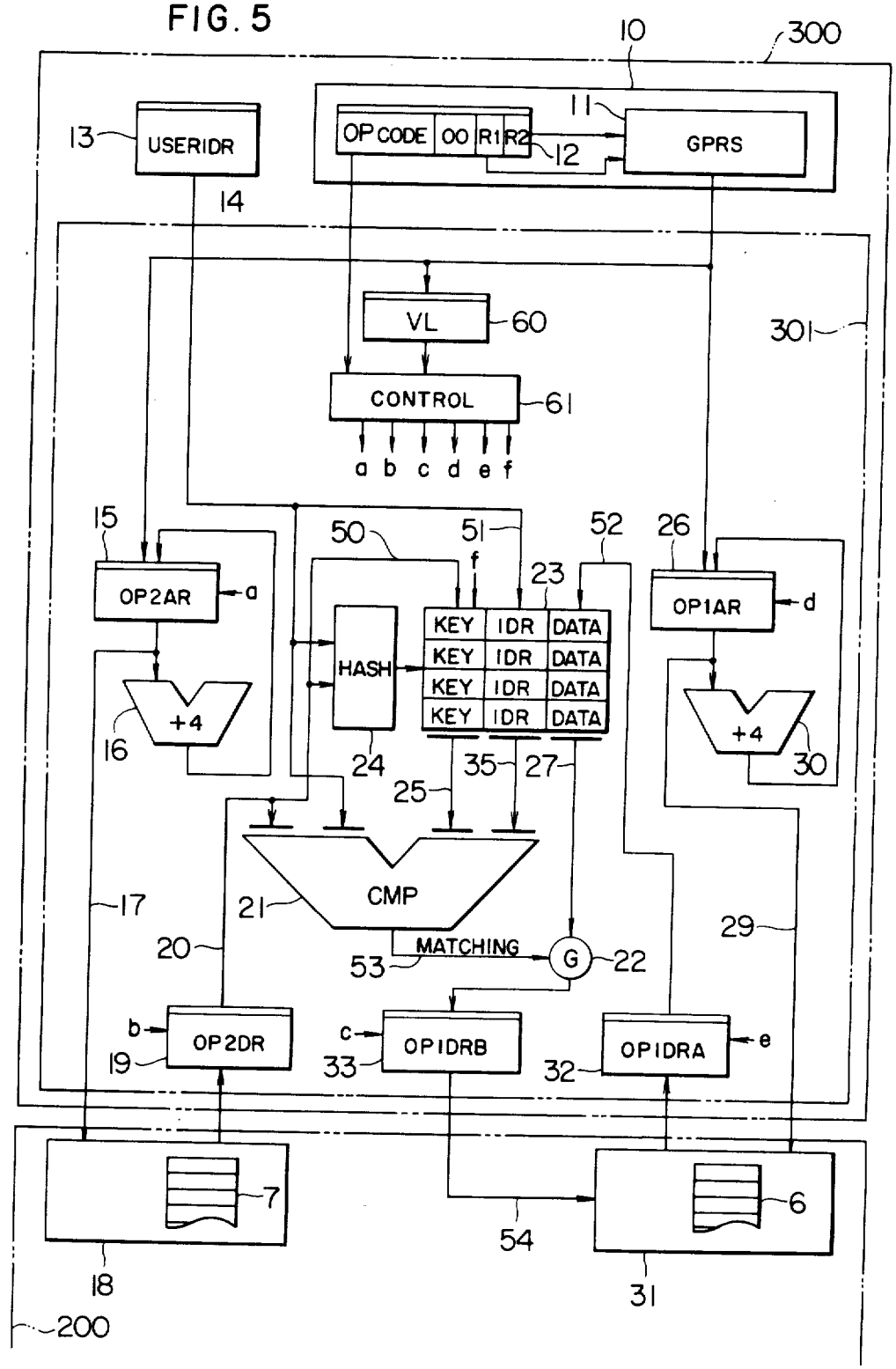
FIG. 5 is a circuit configuration diagram depicting an embodiment of the data conversion apparatus according to the present invention.

FIG. 5 is a schematic circuit diagram of a concrete embodiment of a vector processing circuit for executing the registration and retrieval in the associative memory.

Vector processor 300 includes vector arithmetic unit 302 and instruction control unit 10 and also includes vector data convertor 301 which relates this invention.

First, the operation of the Registration instruction will be described by referring to FIG. 5. When a Registration instruction is inputted to an instruction word register 12, an instruction control unit 10 fetches the first addresses of the first and second operands, respectively specified by the instruction from a group of general-purpose registers (GPRS) 11 and stores the fetched addresses in a first operand address register (OP1AR) 26 and a second operand address register (OP2AR) 15, respectively. The number of vector elements which is stored in a general-purpose register 11 is also transferred to vector length register 60. Vector control circuit 61 controls vector data convertor 301 in response to an operation code in the instruction word register 12, and the number of vector elements in vector length register 60 to execute registration or retrieve instructions. The signals a to e are generated in response to both registration and retrieve instructions and control various registers to set input signals therein repeatedly until all vector elements of the designated length are stored therein. The signal f is generated in response to the registration instruction and orders the memory 23 to store data provided by lines 50, 51 and 52. The memory 23 performs a read operation when the signal f is not applied thereto.

The output from the OP1AR is transferred as a fetch address for the vector work area 31 to a main storage 200 via an address line 29, while the read data is stored in a first operand read data A-register (OP1DRA) 32.

At the same time, the output from the OP2AR is transferred as a fetch address for the vector work area 18 to the main storage 200 via an address line 17, while the fetch data is stored in a second operand data register (OP2DR) 19.

The contents of OP1AR and OP2AR are incremented by four by use of adders (+4) 30 and 16, respectively for each cycle so as to successively fetch the consecutive first and second operands, respectively corresponding to each vector for each cycle.

The memory for association data 23 of FIG. 3 is constructed in a 4 columns by 1 row structure according to the congruent system in which a column address is generated by use of a hash circuit (HASH) 24 receiving outputs from the user identifier register (USERIDR) 13 and the OP2DR. In the HASH, two low-order bits of the USERIDR and those of the OP2DR are Exclusive ORed with respect to the bits at the same bit positions, and the resultant two bits are outputted as a column address. A comparator 21, a gate 22 and the memory for association data 23 constitute associative memory means.

When a Registration instruction is executed, the output from the OP2DR is stored via a line 50 in the first field of the associated memory entry specified by the column address from the HASH 24, the output from the USERIDR is stored in the second field thereof via a line 51, and the output from the OP1DRA is stored in the third field thereof via a line 52. The store operation is successively executed for each cycle in synchronism with the cycle allocated to the OP1AR and OP2AR address update operations.

In this manner, the associative key vector data having the associative key as a vector element and the retrieval vector data having the retrieval output data as a vector element can be sequentially registered for each vector element to the corresponding fields of the memory for association data 23. The Registration instruction is executed automatically by the control program or in response to an indication from the user, example, consecutively fetched from the disk 110 to the main storage 200.

The store operation is successively executed for each cycle in synchronism with the cycle allocated to the OP1AR and OP2AR address update operations.

Next, the operation of the Retrieve instruction will be described. The instruction control unit 10 stores the first addresses of the first and second operands in the OP1AR and OP2AR, respectively in the same manner as for processing a Registration instruction.

Each element of the second operand is fetched from the vector work area 18 and is stored in the OP2DR, and an column address of the memory 23 is obtained by inputting the outputs from the OP2DR and USERIDR to the HASH in the same manner as described in conjunction with the operation of the Registration instruction.

When a Retrieve instruction is executed, the conversion input vector data 7 comprising the vector elements of the same type as the associative key are stored in the vector work area 18. The stored data is fetched for each vector element by use of the address supplied from the OP2AR and is loaded in the OP2DR. Based on the contents of the OP2DR and USERIDR, an associative memory entry specified by the column address from the HASH is fetched, and the output (data line 25) from the first field and the output (data line 35) from the second field are compared with the outputs from the OP2DR and USERIDR, respectively by use of a compare circuit 21 so as to determine whether or not they are identical to the compared data items, respectively. If these two fields are matched respectively, the compare circuit 21 controls a gate 22 by use of an output signal on a signal line 53 so as to store the retrieval output (data line 27) from the third field of the associative memory entry into the first operand store data register (OP1DRB) 33. During the next cycle, the output from the OP1DRB is stored into the vector work area 31 via a line 54 by use of the output from the OP1AR as the store address. Obviously, the compare circuit 21 initiates the compare processing on the next vector element during this cycle.

Since the content of the OP1AR is incremented by the adder 30 for each cycle, the first operand is loaded for each cycle with the content of the retrieval data in an entry in the associative memory for which both the user specified associative key and the user identifier specified as vector elements of the second operand vector are matched, respectively. However, if there does not exist an associative memory entry having the content equal to the vector elements, the data store operation on the pertinent element of the first operand is not carried out; or a specific value, for example, "0" is stored in the field of the element, which is easily achieved by the gate 22 as follows. When the compare circuit 21 outputs an output signal indicated an unmatched result, the gate 22 stores a specific value, for example, "0" in the OP1DRB.

In this manner, the vector work area 31 is loaded with the conversion output vector data having the retrieved output data as a vector element corresponding to the conversion input vector data stored in the vector work area 18. The vector data conversion is sequentially executed for each vector element, this means that the vector processor functions can be suitably applied to this processing.

In the embodiment of FIG. 5, although the associative memory is configured in a 4 columns by 1 row structure in the congruent system; the numbers of columns and rows can be respectively increased without any difficulties. When the number of rows is increased, the replacement control must be conducted between rows, which can be achieved by use of well known techniques.

This embodiment can be easily modified to specify a third operand for adding bits each indicating presence or absence of each vector element of the conversion vector in the associative memory 23 to each vector element of the vector data after conversion.

Figure 1:
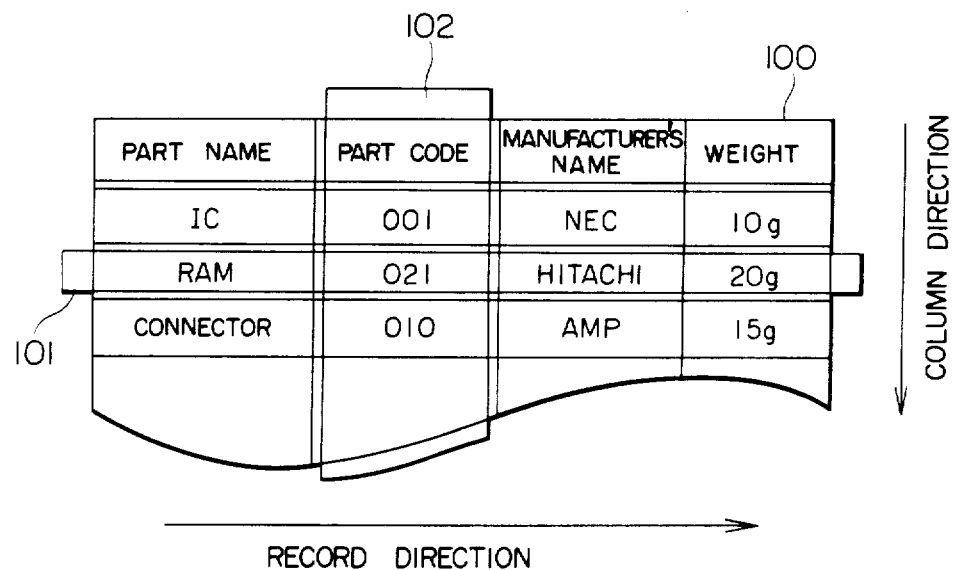
FIG. 1 is a simplified schematic diagram illustrating a logical data structure of a relational data base.
Figure 2:
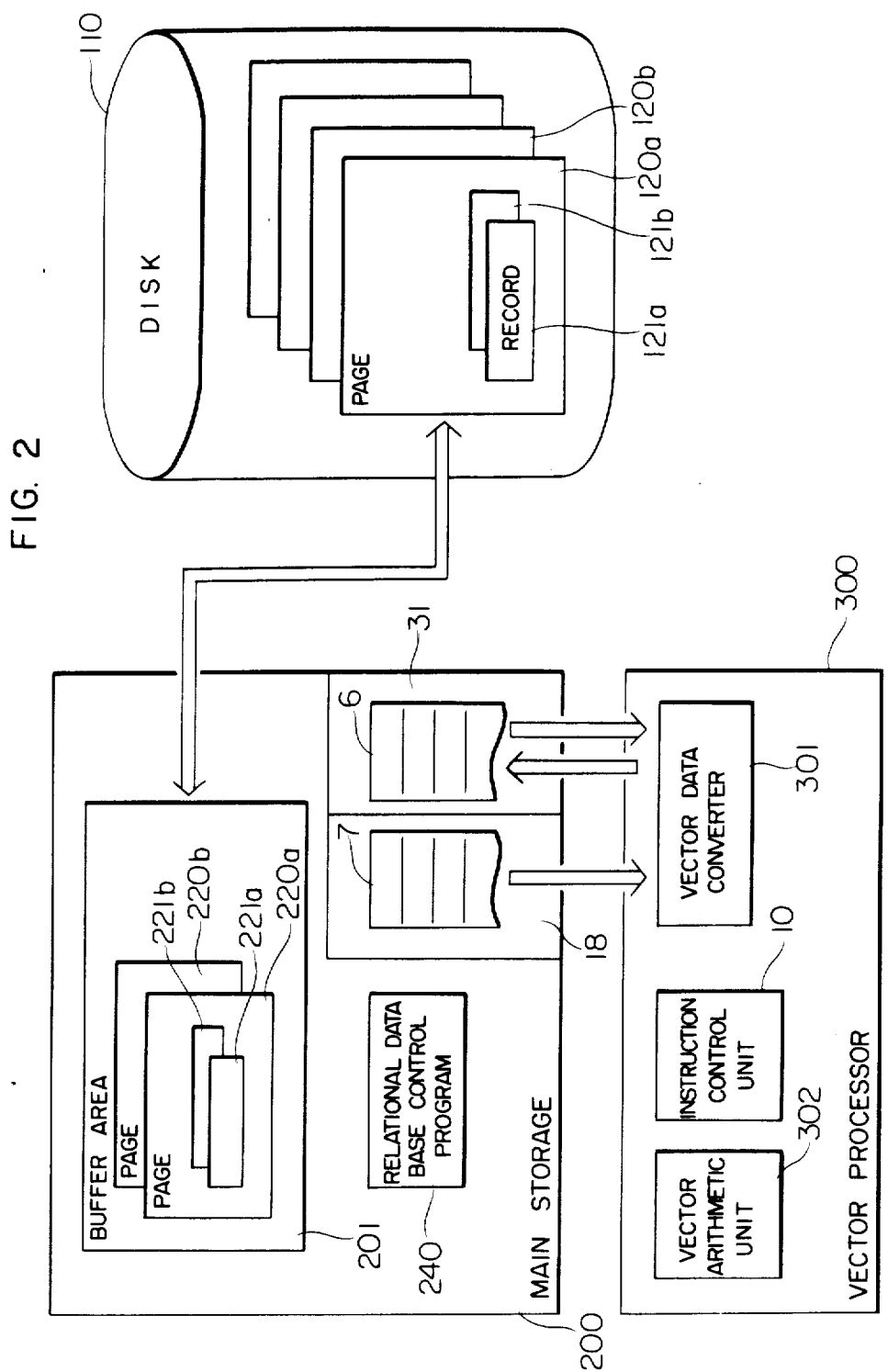
FIG. 2 is a schematic block diagram depicting a relational data base system to which the data conversion apparatus of the present invention is applied.

Next, utilization of these two instructions will be more precisely described with reference to FIG. 2. When the relational data base program is first indicated, the buffer area 201 is empty. Consequently, the pages for storing the parts table of FIG. 1 are fetched in their entirety from the disk 110 and are stored in appropriate locations of the buffer area 201. A list of the fetched page numbers is created as the vector data 7 in the main storage, whereas a list of the main storage addresses in the buffer area for storing the pages is created as the vector data 6. Finally, a Registration instruction designating the vector data 6 and the vector data 7 as the first and second operands, respectively is executed. In this case, the number of pages is specified as the number of vector elements. The relation between the page in numbers and main storage addresses is registered in the associative memory by executing the Registration instruction.

When a retrieve request is issued to the relational data base, above-mentioned step (2) is executed to perform the address conversion. The relational data base program then extracts only the portion of the page numbers from the record address list and stores the data in the field of the vector data 7 of the main storage. Under this condition, if a Retrieve instruction designating the vector data 6 and the vector data 7 as the first and second operands is executed, then the main storage address of the page storing each record is obtained in the vector data 6. In this case, the number of records is specified as the number of vector elements. Finally, the main storage address of each record is calculated by use of simple vector instructions such as an Add instruction and a Move instruction with an indirect address function because the record storage address is acquired by merging the page main storage address with the displacement part in the record address. These simple instructions are executed in vector arithmetic unit 302 in FIG. 2.

Although it is assumed in the instruction utilization example described above that the pages are entirely fetched from the disk in advance, these instructions can be also utilized even if the pages are read from the disk 110 on demand. In this system, after the Retrieve instruction is executed, the vector data 6 is checked and a list of records for which the address conversion could not be performed is created. Referring to the created list, a list of page numbers to be read is created, then the pertinent pages are read from the disk 110. Next, a list of page numbers fetched and a list of main storage addresses in the corresponding buffer area are registered to the associated memory by use of a Registration instruction.

In accordance with the present invention, since the registration operation on the retrieve operation with respect to the associated memory each requires only a period of time equivalent to a cycle for each vector element. Conventionally for the retrieve operation, an operation process is executed after the preceding operation step is completed, that is, a fetch step for reading an associative key, a step for calculating a column address of the associative memory, a step for fetching the associative memory, a step for comparing the associative memory output, and a step for storing the retrieve output are sequentially executed. Even if an instruction is executed for each cycle in each step, five cycles are necessary to accomplish the overall processing; consequently, the processing speed is expectedly increased to be five times as fast as the conventional processing speed by use of the present invention.

In addition, since the user identifier unique to the user and which cannot be arbitrarily modified by the user is also stored in the associative memory, there does not exist any chance for a user to erroneously access the data stored in an associative memory cell by other users. The above embodiment can be modified so as to add a data storage device connected to the main storage 200 such as vector registers used in U.S. Pat. No. 4,128,880, to use the added data storage device instead of the vector work areas 18, 31.

We claim:
1. A data processor comprising:
   (a) a data storage for holding plural vector data each comprised of an ordered set of one or more vector elements;
   (b) associative memory means for holding associative keys and data items corresponding to respective keys and for providing one of said data items whcih corresponds to one of said associative keys when an associative key input provided thereto coincides with said one associative key, as a result of conversion of said associative key input, said associative memory means including means for enabling pro- viding data items at a same rate as receiving of associative key inputs;

(c) read means connected to said data storage and said associative memory means and responsive to a first vector instruction requiring registration of vector data in said associative memory means for sequentially reading out vector elements of first vector data and vector elements of second vector data both designated by said first vector instruction to supply said associative memory means the vector elements of the first data to be stored therein as associative keys and the vector elements of the second vector data to be stored as data items corresponding to the associative keys and responsive to a second vector instruction requiring conversion of vector data into another vector data by means of said associative memory means for sequentially reading out vector elements of vector data to be converted in an area of said data storage means designated by said second vector instruction to supply the vector elements to said associative memory means as associative key inputs; and (d) store means connected to said data storage means and said associative memory means and responsive to said second vector instruction for sequentially storing data items provided sequentially from said associative memory means as a result of the sequential supply of the associative key inputs, to an area of said data storage designated by said second vector instruction, as vector elements of vector data to be generated as a result of conversion of the vector elements of the vector data to be converted.

2. A data processor according to claim 1, further comprising means connected to said associative memory means and responsive to said first vector instruction, for supplying a user identifier to said associative means, to be written therein, together with each vector element of the first vector data, as an associative key and responsive to said second vector instruction, for supplying a user identifier to said associative memory means, to be used, together with each vector element of the vector data to be converted, as an associative key input.

* * * * *